April 29, 1958     W. G. CLARK     2,832,486
TILTABLE TRAILER

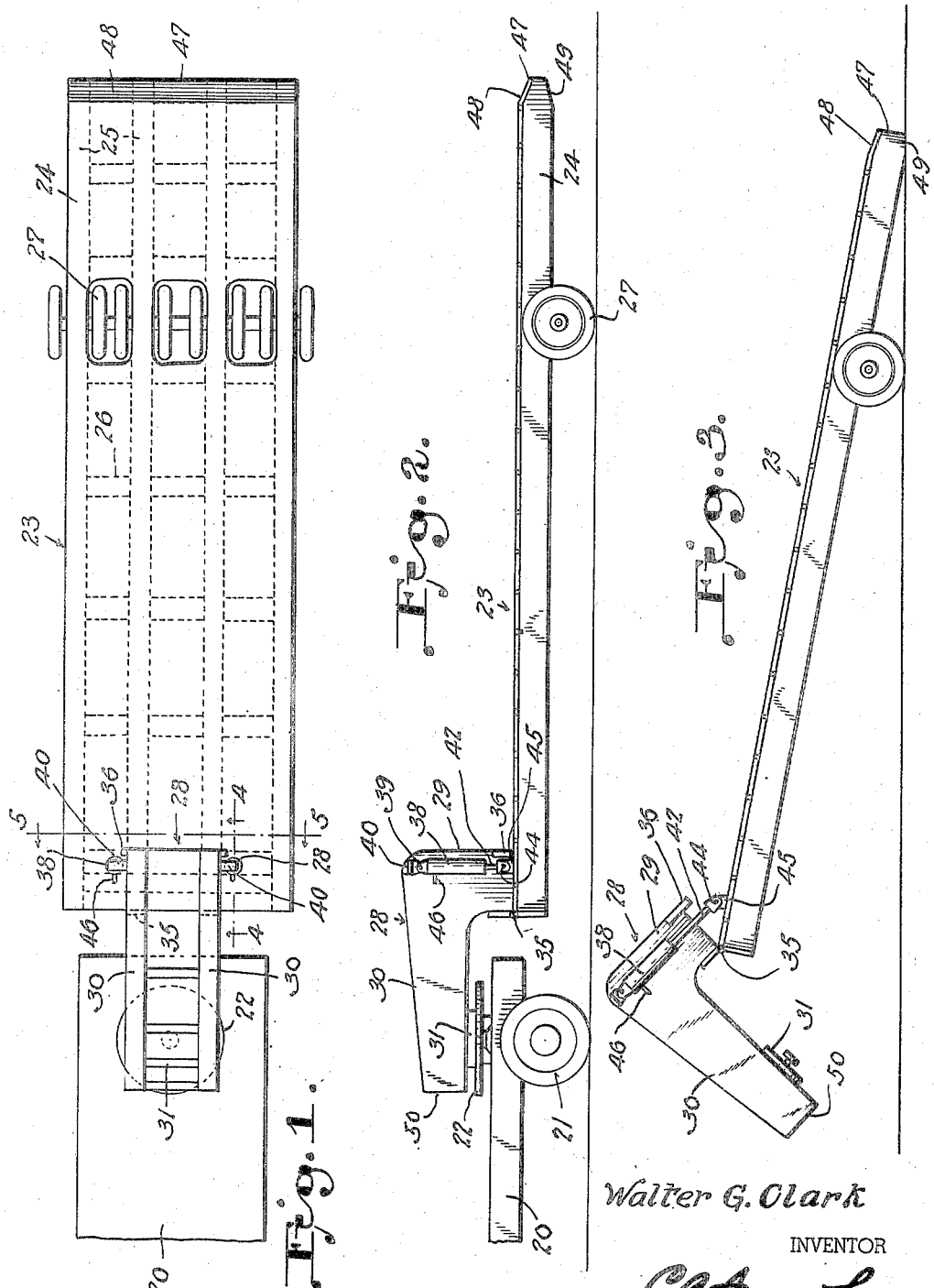

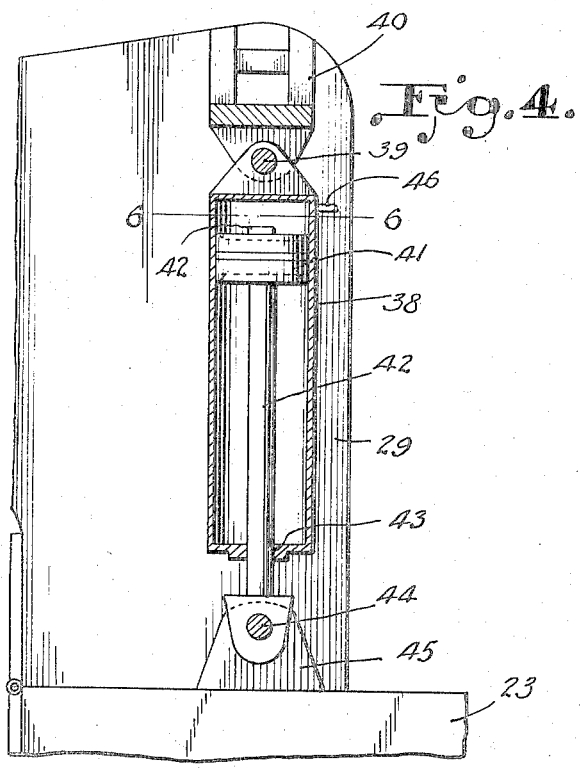
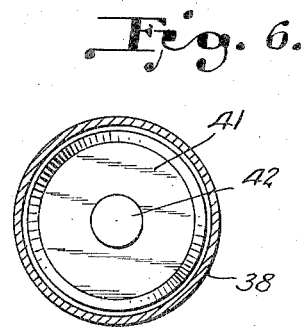
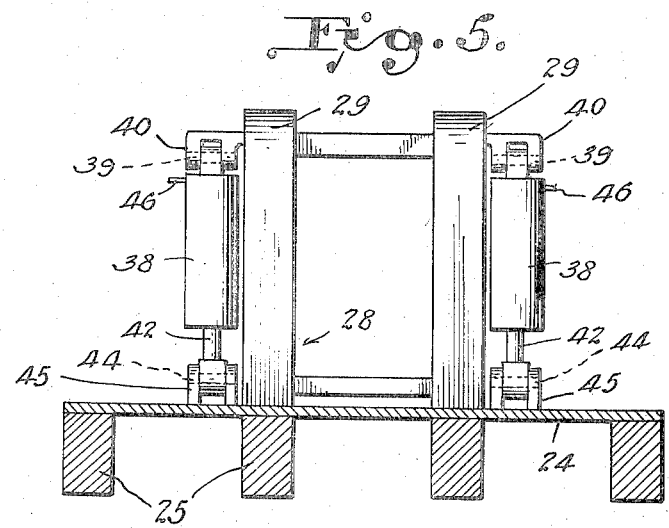

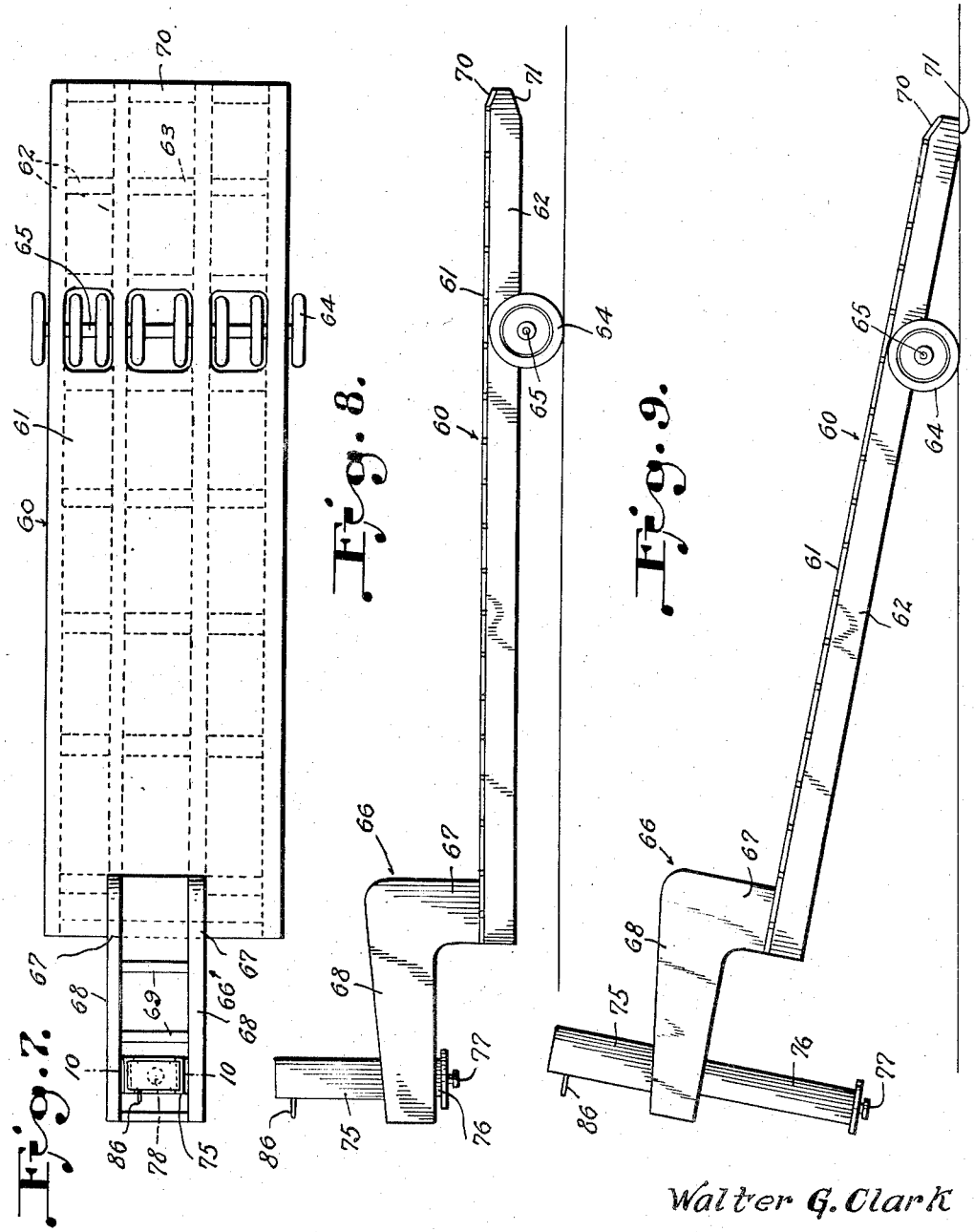

Filed Feb. 10, 1955     4 Sheets-Sheet 4

Walter G. Clark
INVENTOR

BY *CA Snowles*
ATTORNEYS.

United States Patent Office 2,832,486
Patented Apr. 29, 1958

2,832,486

TILTABLE TRAILER

Walter G. Clark, Charleston, W. Va.

Application February 10, 1955, Serial No. 487,266

2 Claims. (Cl. 214—506)

This invention relates to a tiltable trailer, and more particularly to a trailer of the low platform type adapted to be drawn by a truck tractor or the like, and has as its primary object the provision of a trailer construction of this nature which obviates the necessity for the use of a ramp for loading and unloading the same.

An additional object of the invention is the provision of a trailer of this character which may be tilted, in order that such self propeller machinery as steam shovels, bulldozers, tractors or any heavy object may be carried thereby, and the propulsive mechanism of such devices utilized in loading and unloading the same, thus obviating the necessity for separate ramps, or such devices as cranes or the like for loading and unloading.

An additional object of the invention is the provision of such a device which is relatively simple and inexpensive to manufacture, assemble and utilize, and which may be employed in conjunction with any conventional type truck tractor, and tilted with a minimum of mechanical effort and difficulty.

A further object of the invention is the provision of such a device which obviates the necessity for having removable wheels or a non-integral ramp.

Still other objects reside in the combinations of elements, arrangements of parts, and features of construction, all as will be more fully pointed out hereinafter and disclosed in the accompanying drawings, wherein there are shown preferred embodiments of this inventive concept.

In the drawings,

Figure 1 is a top plan view of one form of device embodying features of the instant inventive concept.

Figure 2 is a side elevational view of the trailer in towing position.

Figure 3 is a side elevational view of the construction of Figures 1 and 2 shown in loading or unloading position, the trailer being tilted.

Figure 4 is a sectional view taken substantially along the line 4—4 of Figure 1 as viewed in the direction indicated by the arrows.

Figure 5 is a sectional view taken substantially along the line 5—5 of Figure 1 as viewed in the direction indicated by the arrows.

Figure 6 is an enlarged sectional view taken substantially along the line 6—6 of Figure 4.

Figure 7 is a top plan view of a modified form of construction similar to Figure 1.

Figure 8 is a side elevational view of the construction of Figure 7 shown in carrying position.

Figure 9 is a side elevational view of the construction of Figures 7 and 8 shown in loading or unloading position.

Similar reference characters refer to similar parts throughout the several views of the drawings.

Figure 10:
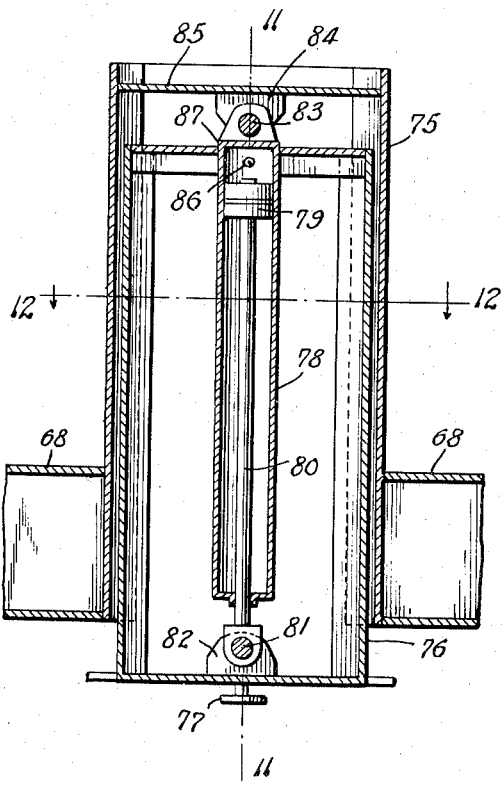
Figure 10 is a sectional view on an enlarged scale taken substantially along the line 10—10 of Figure 7.

Having reference now to Figures 1 to 6 inclusive, and the modification shown therein, there is generally indicated at 20 a fragment of a tractor truck or the like, which includes the customary propulsive wheels 21, and the usual or conventional fifth wheel 22, to which is adapted to be attached the hitch of a trailer truck, the latter being generally indicated at 23.

The trailer as disclosed at 23 is comprised of a body portion, including a top 24 which is provided with underlying longitudinal reinforcing beams 25 as well as transverse beams 26 and which adjacent the rear end thereof, is provided with a multiplicity of supporting wheels 27. The forward end of the trailer 23 is provided with a gooseneck generally indicated at 28, which includes a vertical portion 29, and a horizontal portion 30, the latter being provided with a conventional attaching means 31 for connection to the fifth wheel 22 of the towing vehicle. In the preferred embodiment of this inventive concept the horizontal portion 30 comprises two separate forwardly extending beams as best shown in Figure 1.

Gooseneck 28 is hingedly connected as at 35 to the forward end of trailer 23, the hinge being positioned at one end of the vertically extending portion 29. The opposite end of portion 29 is provided with a pair of locking pins 36 which extend into suitable apertures in the trailer body.

Positioned on opposite sides of vertical portions 29 of the gooseneck member 28 are a pair of cylinders 38, which are pivotally connected at their upper ends by means of pivots 39 to fittings 40 which extend from the sides of member 29.

As best shown in Figure 4, each of cylinders 38 contains a piston 41, connected to a piston rod 42, which extends through a suitable aperture 43 in the bottom of cylinder 38, and is pivotally connected as by a pivot 44 to a bracket 45, which is fixedly secured to the top 24 of trailer 23. Hydraulic fluid is adapted to be introduced into the cylinder 38 from any suitable source of supply through an inlet 46, positioned above the piston 41, in such manner that downward pressure exerted by the hydraulic fluid on piston 41 will tilt the gooseneck from the position disclosed in Figure 2 to that disclosed in Figure 3, about the hinge 35.

In this position the entire body of trailer 23 is tilted, so that the rear end 47 thereof, which is beveled at the upper and lower edges as indicated at 48 and 49 respectively rests on the ground to provide substantially an integral ramp, by means of which self propelled vehicles or other heavy objects may be loaded and unloaded on the trailer body.

Obviously, release of the hydraulic fluid in cylinders 38 from any suitable outlet will serve to release the pressure on piston 41, whereby the normal weight of the trailer, or any article or body carried thereby will cause the parts to reassume the position shown in Figure 2, whereupon the device is ready for towing. It is to be noted that the ends 50 of normally horizontal portions 30 fulcrum on the body of the truck tractor to elevate the trailer body to the position shown in Figure 3.

Figure 11:
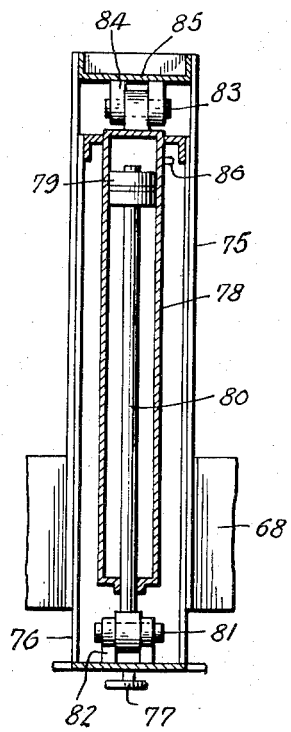
Figure 11 is a sectional view taken substantially along the line 11—11 of Figure 10.
Figure 12:
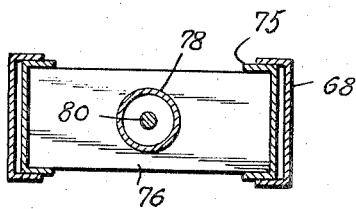
Figure 12 is a sectional view taken substantially along the line 12—12 of Figure 10 as viewed in the direction indicated by the arrows.

Figures 7 to 12 inclusive disclose a somewhat modified form of construction wherein there is shown a trailer body generally indicated at 60, including a covering surface 61, longitudinally extending reinforcing members 62, and transversely extending reinforcing members 63. The body 60 is also provided with a multiplicity of wheels 64 suitably carried by a rear supporting axle 65.

The forward end of the vehicle carries a gooseneck construction 66, including spaced apart vertical plates 67, integral with horizontal plate portions 68. Portions 68 are connected as by means of reinforcing members 69 (Figure 7). The rear end of trailer body 60 is provided with upper and lower cutaway portions 70 and 71, corresponding to the portions 48 and 49 of the previously discussed modification.

In this form of the invention gooseneck member 66 is rigidly affixed to trailer body 60, and is not hinged as in the preceding modification.

Positioned between horizontally extending plates 68 adjacent the ends thereof is a pair of channel irons 75, or housing, which are fixedly secured to the opposite side plates 68 and which have slidably mounted therebetween, a rectangular housing 76, at the lowermost extremity of which is a fitting 77 adapted to engage the fifth wheel of a truck tractor or the like. The housing 76 is provided interiorly with a cylinder 78, containing a piston 79, connected to a piston rod 80, the latter in turn being pivoted as by a pivot 81 to a bracket 82 secured to the bottom of housing 76. The upper end of cylinder 78 is pivoted as by a pivot 83 to a fitting 84 carried by the top wall 85 of housing 75.

Hydraulic fluid is introduced through a suitable opening 86 to force the housing 75 upwardly over housing 76 and correspondingly to exert a downward pressure on the housing 76 in such manner that the parts take the position disclosed in Figure 9, thus tilting the trailer. It should be noted in this connection that the housing 76 is provided at its upper end with an aperture 87, to permit movement thereof relative to cylinder 78, the upper end of cylinder 78 extending through the aperture 87 for connection with pivot 83.

In this modification as the hydraulic fluid is introduced into the cylinder 78, the piston is moved downwardly, with the housing 76 to the position as indicated in Figure 9 to tilt the trailer 60 into engagement with the ground, in a manner substantially similar to that of the previously discussed modification.

From the foregoing it will now be seen that there is herein provided an improved tiltable trailer, which accomplishes all of the objects of this invention, and others, including many advantages of great practical utility and commercial importance.

As various embodiments may be made of this inventive concept, and as various modifications may be made in the embodiments hereinbefore shown and described, it is to be understood that all matter herein is to be interpreted merely as illustrative and not in a limiting sense.

I claim:

1. In combination, an elongated trailer body, wheels adjacent to the rear end of said body, a gooseneck carried by the front end of said body, a fifth wheel coupling pin, hydraulic mechanism connected between said coupling pin and front end of said gooseneck, comprising an outer housing extending upwardly from said gooseneck, an inner housing slidably mounted within said vertical housing to which said coupling pin is connected, a hydraulic cylinder extending through the upper end of said inner housing pivotally connected with said vertical housing, the piston and piston rod operating within said hydraulic cylinder, said rod being connected with said inner housing for moving said outer housing and said front end of said body vertically.

2. In combination, an elongated trailer body, wheels adjacent to the rear end of said body, a gooseneck rigidly secured to the front end of said body, a fifth wheel coupling pin, hydraulic lifting mechanism connected between said coupling pin and front end of said gooseneck, said hydraulic lifting mechanism comprising an outer housing embodying a pair of vertical channel irons having confronting open sides rising from said gooseneck, a top wall connecting said channel irons, an inner rectangular housing slidably mounted between said channel irons, a cylinder extending through the upper end of said inner housing pivotally connected to said top wall, a piston including a rod operating in said inner cylinder, said fifth wheel coupling pin being connected to the lower end of said inner housing.

References Cited in the file of this patent

UNITED STATES PATENTS

| | | |
|---|---|---|
| 2,351,829 | Milner | June 20, 1944 |
| 2,425,521 | Ellberg | Aug. 12, 1947 |
| 2,545,584 | Meadows | Mar. 20, 1951 |
| 2,667,363 | Talbert | Jan. 26, 1954 |
| 2,689,137 | Iddings et al. | Sept. 14, 1954 |
| 2,709,087 | Jenkins et al. | May 24, 1955 |
| 2,754,987 | Kern | July 17, 1956 |

FOREIGN PATENTS

| | | |
|---|---|---|
| 760,730 | France | Dec. 27, 1933 |